United States Patent [19]

Kraus et al.

[11] 3,758,677

[45] Sept. 11, 1973

[54] PREPARATION OF NON-SOLVATED ALUMINUM HYDRIDE

[75] Inventors: Theodore C. Kraus, Cheshire; Donald J. Mangold, Orange, both of Conn.

[73] Assignee: Olin Mathieson Chemical Corporation, New Haven, Conn.

[22] Filed: Oct. 23, 1965

[21] Appl. No.: 505,314

[52] U.S. Cl.................. 423/645, 149/19, 149/60, 149/76, 149/77
[51] Int. Cl.............................................. C01b 6/00
[58] Field of Search....................... 23/204; 423/645

[56] References Cited
OTHER PUBLICATIONS

Rice, Jr. P.B. Report 127, 867, Non–Solvated Aluminum Hydride, 1956, pages 2 and 3 QD 181 A4 T9.
Cotton, Progress In Inorganic Chemistry, Vol. III, 1962, page 491 QD 151 P7.

Primary Examiner—Leland A. Sebastian
Attorney—Walter D. Hunter, Donald F. Clements, Richard S. Strickler and George J. Koeser

EXEMPLARY CLAIM

1. A process for the preparation of non-solvated aluminum hydride which comprises (A) reacting hydrogen chloride with an excess of an alkali metal aluminum hydride of the formula:

$$M\ AlH_4$$

where M is an alkali metal selected from the group consisting of lithium, sodium and potassium and in the presence of a lower dialkyl ether of the formula:

$$R_1OR_2$$

wherein $R_1$ and $R_2$ are alkyl radicals having 1 to 5 carbon atoms, the mole ratio of the said hydrogen chloride reacted with the said alkali metal aluminum hydride being within the range of from about 0.33 to about 0.95; (B) separating liquid and solid phases of the resulting reaction mixture and adding from about 0.05 to 0.20 mole of lithium borohydride per mole of starting alkali metal aluminum hydride to the said liquid phase; (C) adding an aromatic hydrocarbon selected from the group consisting of benzene, toluene and xylene in an amount of from 1 to about 6 times by volume of the said liquid phase; (D) removing the major portion of the lower dialkyl ether to yield a slurry containing solvated aluminum hydride; (E) heating the said slurry at a temperature of from about 35 to about 100° C. and for a period of time sufficient to remove the lower dialkyl ether associated with the aluminum hydride whereby a non-solvated aluminum hydride product is obtained and (F) recovering the non-solvated aluminum hydride.

4 Claims, No Drawings

PREPARATION OF NON-SOLVATED ALUMINUM HYDRIDE

This invention relates to the preparation of macrocrystalline, non-solvated aluminum hydride. More particularly, this invention relates to a process in which hydrogen chloride is reacted with an excess of lithium aluminum hydride in the presence of a solvent following which the non-solvated aluminum hydride is finally recovered from mixed solvent system.

Aluminum hydride is useful as a reducing agent, as a fuel in solid propellants, and as an intermediate. The non-solvated aluminum hydride of this invention when incorporated with oxidizers is capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

Although a great number of attempts have been made to prepare non-solvated aluminum hydride, the end result has been the formation of either an impure polymeric product or a solid solvated polymer from which the removal of all of the solvent without decomposition could not be achieved. Finholt et al, (JACS, 69, 1199-1203 (1947)) reacted lithium aluminum hydride with aluminum chloride in the presence of diethyl ether and obtained a solid with a variable composition. Although the ratio of hydrogen to aluminum in the solid was 3:1 within experimental error, the total weight of the aluminum and the hydrogen in the solid product was always less than the total weight of the sample, the difference being the weight of the diethyl ether in the solvated compound. Hurd (Chemistry of the Hydrides, 1952, John Wiley and Sons, Inc., pages 95-98) presents a thorough review of laboratory methods for the preparation of solvated-aluminum hydride. Hurd states that aluminum hydride never has been isolated except in the form of a highly polymerized compound having the general formula $(AlH_3)_x$. Further, Hurd states the lithium aluminum hydride can be reacted with aluminum chloride in ether solution to form lithium chloride and a solution of aluminum hydride in ether and that this solution of aluminum hydride cannot be evaporated to obtain a volatile aluminum hydride. Chizinsky et al, (JACS, 77, 3164-5, (1955)) have described a method for the preparation of non-solvated aluminum hydride. First, a solution of aluminum hydride in diethyl ether was prepared by reaction of lithium aluminum hydride and aluminum chloride. The solution of aluminum hydride was filtered promptly (before polymerization could occur) through sintered glass under nitrogen into an inert liquid (pentane or ligroin were found to be suitable). Chizinsky et al state it is essential that the hydride solution be rapidly mixed with a relatively large volume of the inert liquid and that a satisfactory method is to run the solution in a thin film down a wire while the precipitant is vigorously stirred by a magnetic stirrer. On drying the reresulting fluffy precipitate under vacuum at room temperature for at least twelve hours, a product was obtained which on analysis was shown to correspond to aluminum hydride.

In the process of this invention, hydrogen chloride is reacted with an excess of an alkali metal aluminum hydride dissolved in a lower dialkyl ether to yield aluminum hydride, the alkali metal chloride and hydrogen. The reaction takes place according to the following equation:

$$MAlH_4 + HCl \xrightarrow{dialkyl\ ether} AlH_3 + MCl + H_2$$

wherein M is an alkali metal selected from the group consisting of lithium, sodium and potassium. The alkali metal chloride, being insoluble in the lower dialkyl ether, precipitates during the reaction and is removed by a convenient method, such as by filtration. Hydrogen generated during the reaction is allowed to escape from the reactor and is measured to determine the extent of the reaction. After removal of the insoluble alkali metal chloride by filtration or by any other convenient method, a quantity of an ethereal solution of lithium borohydride can be added, if desired, to the clear liquor. Lithium borohydride aids in desolvation and improves particle crystallinity. Other additives which improve the thermal stability of the final non-solvated aluminum hydride, such as mercury can also be added at this point in the process. Generally from about 0.05 to 0.20 mole of lithium borohydride per mole of starting alkali metal aluminum hydride is employed.

The temperature of the reaction will generally be from about $-25°$ C. to about $+50°$ C. with the preferred temperature being from about $-10°$ C. to about $+32°$ C.

In carrying out the reaction any of the lower dialkyl ethers can be employed. Suitable lower dialkyl ethers include ethyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isobutyl ether, ethyl isoamyl ether, etc.

In conducting the reaction it is advantageous to maintain the intial concentration of the alkali metal aluminum hyride at about 1 to about 7.0 per cent by weight based on the weight of the lower dialkyl ether employed. The proportion of ether to the reactants not only affects the solubility of the reactants but also the extent of solution of the aluminum hydride in the reaction mixture and control of the reaction temperature. In the applicants' novel process it has been found that an excess of the alkali metal aluminum hydride must be employed. Although the role of the excess of the alkali metal aluminum hydride is not fully understood, it is known that the excess of the alkali metal aluminum hydride participates in the solubilization of the aluminum hydride formed in the reaction and, in addition, it appears to play a significant role in the applicants' process in that it makes possible a facile and complete desolvation of the aluminum hydride. The molar ratio of the hydrogen chloride to the alkali metal aluminum hydride employed can be varied widely from about 0.33 to about 0.95 with the preferred molar ratio being from about 0.74 to about 0.95.

In the next step in the process, to the ether-containing solution of aluminum hydride there is added a quantity of aromatic hydrocarbon solvent selected from the group consisting of benzene, toluene and xylene. Usually the volume of the aromatic material employed will be from about 1 to 6 times the volume of the ethereal solution. In the next step the mixture of the aromatic hydrocarbon solvent and the lower dialkyl ether containing the aluminum hydride product is distilled to remove the major portion of the ether, so that the resulting solution contains between about 2 and about 10 weight per cent ether. During this distillation step crystalline solvated aluminum hydride precipitates out. The pressure during the distillation operation can be varied widely and generally will be maintained from about atmospheric to about 100 mm. Hg. In the next step, the ether is removed from the solvated product by increasing the temperature. It is recommended that during the desolvation step the mixture be stirred at a rate of from about 6 r.p.m. to about 120 r.p.m. or more and the slurry containing the solvated aluminum hydride be heated rapidly to 95° C. and maintained between 95 and 100° C. for a period of 0.3 to 1 hour or more at ambient pressure. In the final step, the product is recovered by filtering the slurry or by any other convenient method; washing with a lower dialkyl ether, such as diethyl ether, and then drying the white, non-solvated, aluminum hydride in crystalline form under vacuum conditions or by moderate heating at atmospheric pressure. Other recovery schemes can be employed, if desired.

The non-solvated aluminum hydride produced by practicing the method of this invention can be employed as an ingredient of solid propellant compositions in accordance with general procedures which are well understood in the art, inasmuch as the non-solvated aluminum hydride produced by practicing the present process is readily oxidized using conventional solid oxidizers, such as ammonium perchlorate, potassium perchlorate, sodium perchlorate, ammonium nitrate and the like. In formulating a solid propellant composition employing non-solvated aluminum hydride and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimatly admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided non-solvated aluminum hydride can be admixed with a high solids content solution of a partially condensed urea-formaldehyde or phenol formaldehyde resin, the proportions being such that the amount of the resin is about 5 to 10 per cent by weight, based upon the weight of the oxidizer and the non-solvated aluminum hydride. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al, and U.S. Patent No. 2,646,596 to Thomas et al.

The following examples will serve to further illustrate this invention:

EXAMPLE 1

The apparatus employed consisted of a three-necked flask equipped with a gas inlet tube reaching below the surface of the liquid, thermometer, reflux condenser, mercury-sealed stirrer, and a wet-test meter which was connected to an outlet from the flask.

Over a period of 30 minutes 50 g. (1.24 moles) of lithium aluminum hydride (95 per cent) was dissolved with stirring in 2 liters of diethyl ether. This solution was then cooled to 0° with an ice-water bath, and the hydrogen chloride addition begun. The extent of reaction was monitored by measuring the hydrogen evolution, and the final reading was confirmed by weighing of the hydrogen chloride cylinder before and after reaction. While the reaction mixture was maintained at 5°–10° C., the hydrogen chloride was added over a 55-minute period, liberating 26.08 liters of hydrogen at 23° C. and 760 mm. of Hg. pressure (at S.T.P. - 23.711 l.; 1.06 moles).

The reaction mixture was then allowed to stand for 30 minutes, permitting the lithium chloride to settle, and 1600 ml. of supernatant solution was filtered into a 12 liter, three-necked flask containing 174 ml. of 0.9 M. ethereal lithium borohydride solution. To this was added 6400 ml. of toluene. The solution was then filtered to eliminate the slight residue which developed and was then distilled under the following conditions:

| Time (min.) | Bath temp. (° C) | Pot. temp. (° C) | Head temp. (° C.) | Pot pressure (mm. Hg.) | Vol. distilled (ml.) |
| --- | --- | --- | --- | --- | --- |
| 0 | 25 | 24 | 25 | 760 | 0 |
| 45 | 60 | 46 | 28 | 760 | 0 |
| 55 | 60 | 48 | 38 | 330 | |
| 65 | 60 | 50 | 38 | 340 | |
| 75 | 60 | 50 | 41 | 340 | 100 |
| 85 | 60 | 50 | 44 | 310 | 200 |
| 100 | 59 | 50 | 42 | 300 | |
| 110 | 57 | 50 | 40 | 295 | 300 |
| 115 | 55 | 50 | 45 | 250 | |
| 130 | 65 | 49 | 44 | 250 | |
| 160 | 63 | 49 | 43 | 190 | 1,200 |
| 165 [1] | 62 | 49 | 45 | 170 | 1,400 |
| 173 | | | | | |
| 190 [2] | 60 | 49 | 44 | 170 | 1,600 |
| 220 | 51 | 50 | 45 | 160 | 2,000 |
| 250 | 60 | 48 | 44 | 120 | 2,400 |
| 265 | 54 | 70 | 30 | 750 | |
| 280 | 85 | 64 | 32 | 750 | |
| 295 | 97 | 71 | 34 | 750 | |
| 300 | 99 | 82 | 35 | 750 | |
| 310 | 98 | 86 | 35 | 750 | |
| 325 | 98 | 90 | 35 | 750 | |
| 347 | 106 | 95 | 37 | 750 | |
| 348 | 106 | 99 | 42 | 750 | |
| 358 | 106 | 98 | 37 | 750 | |
| 370 [3] | | 65 | | 760 | |

[1] Solution very slightly cloudy, stirring slowed to 8 r.p.m.
[2] Discrete particles evident.
[3] Cooling bath applied.

During this heating pattern, the pot was connected through a distillation head and water-cooled condenser to a receiver maintained at −78° C. After bringing the pot to atmospheric pressure with nitrogen, the cooled receiver effected a slight vacuum on the system (closed via mercryy bubble-off) throughout the subsequent heating period, and very slow distillation was evident. Following the heating period, the slurry was filtered and the collected solids washed by slurrying with 400 ml. of dried ether. A small amount of grayish material remained in suspension and was removed by decantation (2.5 g.). The remaining white product was washed several times with ether and dried under vacuum for 2 hours to yield 19.1 g. of non-solvated aluminum hydride (75 per cent of the theoretical amount).

|  | % Al | % H | % C | % Cl | % Li |
|---|---|---|---|---|---|
| Anal. Calc'd. for AlH$_3$: | 89.92 | 10.08 |  |  |  |
| Found: | 89.51 | 10.0 | 0.4 | 0.23 | 0.3 |
|  | 89.74 | 10.2 | 0.4 | 0.21 |  |

EXAMPLE II

In a dry nitrogen atmosphere, approximately 620 ml. of the aluminum hydride ether solution (0.328 moles AlH$_3$) containing 17.6 mole per cent excess (0.070 moles) of lithium aluminum hydride (prepared as described in Example I by reacting in diethyl ether hydrogen chloride with an excess of lithium aluminum hydride and then removing the lithium chloride formed by filtration) was placed in a 5-liter flask containing 68 ml. of a 1 M solution of LiBH$_4$ (0.068 mole) in ether. This mixture was then diluted with 3500 ml. of toluene. The resulting cloudy mixture containing (16.5 per cent diethyl ether and 83.5 per cent toluene) was pressure filtered through a medium porosity sintered glass disc covered with glass wool into a five liter, three-necked, flask which had been baked dry and cooled in a nitrogen atmosphere. Approximately 1 ml. (0.065 mole) of mercury was then added.

The five-liter flask was then equipped with a thermometer, magnetically driven paddle stirrer and a distillation head, with thermometer, a water-cooled condenser and receiver. The receiver was connected to a source of dry nitrogen and vacuum. The apparatus was sealed from the atmosphere by a mercury bubble-off. The five-liter flask was then placed in an oil bath preheated to 58° C. the stirrer was set at about 60 r.p.m. and the receiver was cooled with dry ice. Distillation was then conducted under the following conditions:

| Time | Temperature ° C. | | | Pressure (mm. Hg.) | Remarks |
|---|---|---|---|---|---|
|  | Bath | Pot | Head | | |
| 0 | 58 | 24 | 24 | 760 | Flask placed in bath, stirrer started. Vacuum applied |
| 15 | 52 | 42 | 24 |  | slowly. Gentle dropwise distillation maintained by adjusting pressure White precipitate formed. |
| 20 | 52 | 43 | 32 | 220 |  |
| 80 | 51 | 45.5 | 30 | 105 |  |
| 110 | 52 | 43 | 38 | 115 |  |
| 140 | 52 | 44 | 30 | 110 |  |
| 150 | 52 | 44 | 30 | 110 | Vacuum released; approx. 800 ml. of distillate collected. |

The mixture, after standing overnight, was heated in the oil bath from room temperature (18° C.) to 95° C. in 85 minutes and then maintained at 95° – 97° C. for 35 minutes. A slight vacuum was applied after reaching 95° C. to affect a slow distillation (670 to 650 mm. Hg pressure). After 35 minutes the flask was removed from the bath.

After cooling, the precipitate was isolated by filtration and then stirred for about 1/2 hour in about 150 ml. of ether (distilled from lithium aluminum hydride). The ether was removed by decantation after which the white, crystalline particles of product were then washed on the filter with three 50-ml. portions of ether and finally placed under vacuum (about 1 mm. Hg) to dry for two hours. Approximately 6.2 g. (64 per cent yield) of the theoretical quantity of crystalline, white non-solvated aluminum was obtained.

|  | Percent | | | | | | |
|---|---|---|---|---|---|---|---|
|  | Al | H | C | Li | Hg | B | Cl |
| Anal. calc'd. for AlH$_3$ | 89.92 | 10.08 |  |  |  |  |  |
| Found | 86.05 | 10.1 | 0.3 | 0.3 | 0.9 | 0.01 | 0.23 |
|  | 85.49 |  |  |  |  | 0.1 | 0.25 |

EXAMPLES III TO XII

Several additional experiments were conducted in the same manner as described in Examples I and II. The aluminum hydride solution in ether was prepared by reacting an excess of lithium aluminum hydride with hydrogen chloride in diethyl ether and then removing the lithium chloride formed by filtration. Pertinent details are included in Table I which follows:

TABLE 1

| Experiment No. | Aluminum hydride ether solution | | Hydrocarbon added | Ratio hydrocarbon to ether (by vol.) | Distillation | | Conversion | | Elemental analysis | | | Yield | | Product formed |
|---|---|---|---|---|---|---|---|---|---|---|---|---|---|---|
|  | Vol. (ml.) | Excess LiAlH$_4$ (mole percent) |  |  | Temp. (° C.) | Time (hr.) | Temp. (° C.) | Time (min.) | Al | H | C | Grams | Per-cent |  |
| III$^a$ | 625 | 17 | Toluene | 6.2 | 45 | 4.3 | 97–98 | 40 |  | 9.4 | 0.5 | 8.3 | 87 | Granular. |
| IV$^{a,b}$ | 600 | 17 | ...do | 6.2 | 45 | 3.75 | 95–97 | 45 |  | 9.4 | 0.6 | 7.2 | 76 | Do. |
| V$^{a,b}$ | 620 | 17 | ...do | 6.2 | 45 | 2.25 | 95–98 | 35 | 86.8 | 10.1 | 0.3 | 6.2 | 66 | Do. |
| VI$^{a,b}$ | 600 | 17 | ...do | 6.2 | 42–46 | 2.5 | 97–99 | 45 |  | 8.9 | 1.9 |  |  | Do. |
| VII$^{a,b}$ | 600 | 17 | ...do | 6.2 | 40–48 | 4.0 | 97–99 | 45 | 82.4 | 9.5 | 1.6 |  |  | Do. |
| VIII$^{a,b}$ | 300 | 17 | ...do | 6.2 | 41–51 | 2.2 | 95–100 | 50 |  | 9.5 | 1.0 | 3.5 | 75 | Do. |
| IX$^{a,b}$ | 600 | 17 | ...do | 6.2 | 43–50 | 3.0 | 95–100 | 45 |  | 9.6 | 0.9 | 7.5 |  | Do. |
| X$^{a,b}$ | 600 | 17 | ...do | 6.2 | 40–50 | 2.6 | 95–100 | 35 |  | 8.5 | 0.5 | 7.5 |  | Needles. |
| XI$^a$ | 300 | 17 | Benzene | 6.2 | 45 | 1.5 | 80 | 45 |  | 8.5 | 3.1 |  |  | Granular. |
| XII$^a$ | 250 | 17 | ...do | 6.2 | 42 | 1.8 | 80 | 60 |  | 8.9 | 1.8 |  |  | Needles. |

$^a$ Lithium borohydride added to solution.
$^b$ Mercury added to solution.

EXAMPLE XIII 50 grams of lithium aluminum hydride of 95 per cent purity was placed in a three-liter, three-necked, round-bottomed flask, which had been purged with dry nitrogen. Two liters of diethyl ether was then added and the mixture stirred until the lithium aluminum hydride was dissolved. The hydrogen chloride was then added at a rate of 0.53 mole per min.. Hydrogen off-gas was measured with a wet-test meter and when it was determined by gas measurement that 1.06 moles of lithium aluminum hydride had reacted, the addition of hydrogen chloride was stopped. 1600 ml. of the reaction mixture was then filtered into a 5-liter flask following which 3200 ml. of toluene and 174 ml. of a 0.9 molar lithium borohydride ether solution was added. This solution was then filtered in a five-liter, three-necked, round-bottomed flask, which was fitted with magnetic stirrer. This water-white solution was heated as shown below:

| Time (min.) | Bath temp. (° C.) | Pot temp. (° C.) | Pressure (mm. Hg.) | Vol. distilled (ml.) | Remarks |
|---|---|---|---|---|---|
| 0 | 55 | 34 | 265 | 0 | Solution water white. |
| 20 | 68 | 47 | 305 | 500 |  |
| 55 | 61 | 50 | 251 |  | Solution slightly cloudy. |
| 65 | 61 | 50 | 230 | 1,000 | Granules formed. |
| 125 | 60 | 51 | 145 | 1,600 |  |

| Time (min.) | Bath temp. (°C) | Pot. temp. (°C) | Pressure (mm. Hg.) | Vol. distilled (ml.) | Remarks |
|---|---|---|---|---|---|
| 140 | 60 | 50 | 125 | | Sampled for percent Et₂O (3.9 wt. Et₂O). |
| 145 | 60 | 50 | Atm. | | Started to heat to 100° C. 4 ml. of Hg. was added. |
| 180 | 100 | 87 | Atm. | | |
| 189 | 109 | 95 | Atm. | | |
| 109 | 113 | 101.5 | Atm. | | |
| 239 | 110 | 101 | Atm. | | Began to cool bath. |

The resulting slurry was filtered and the product washed with dry diethyl ether. The non-solvated aluminum hydride product which was dried under vacuum, was obtained in 60 per cent yield.

| | Percent | | | |
|---|---|---|---|---|
| | Al | H | C | Cl |
| Anal. calc'd for AlH₃ | 89.92 | 10.08 | | |
| Found | | 9.8 | 0.4 | 0.13 |

What is claimed is:

1. A process for the preparation of non-solvated aluminum hydride which comprises (A) reacting hydrogen chloride with an excess of an alkali metal aluminum hydride of the formula:

$$M\ AlH_4,$$

where M is an alkali metal selected from the group consisting of lithium, sodium and potassium and in the presence of a lower dialkyl ether of the formula:

$$R_1OR_2,$$

wherein $R_1$ and $R_2$ are alkyl radicals having 1 to 5 carbon atoms, the mole ratio of the said hydrogen chloride reacted with the said alkali metal aluminum hydride being within the range of from about 0.33 to about 0.95; (B) separating liquid and solid phases of the resulting reaction mixture and adding from about 0.05 to 0.20 mole of lithium borohydride per mole of starting alkali metal aluminum hydride to the said liquid phase; (C) adding an aromatic hydrocarbon selected from the group consisting of benzene, toluene and xylene in an amount of from 1 to about 6 times by volume of the said liquid phase; (D) removing the major portion of the lower dialkyl ether to yield a slurry containing solvated aluminum hydride; (E) heating the said slurry at a temperature of from about 35 to about 100° C. and for a period of time sufficient to remove the lower dialkyl ether associated with the aluminum hydride whereby a non-solvated aluminum hydride product is obtained and (F) recovering the non-solvated aluminum hydride.

2. The process of claim 1 wherein the reaction is carried out at a temperature within the range of from about −25° C. to about + 50° C.

3. The process of claim 1 wherein the said alkali metal aluminum hydride is lithium aluminum hydride.

4. The process of claim 1 wherein the said lower dialkyl ether is diethyl ether.

* * * * *